United States Patent Office 3,012,072
Patented Dec. 5, 1961

3,012,072
SUBSTITUTION PRODUCTS OF POLYFLUORO-
OLEFINS AND PROCESSES FOR THE PREPARA-
TION THEREOF
Robert Neville Haszeldine, Cambridge, England, assignor
to Pennsalt Chemicals Corporation, Philadelphia, Pa.,
a corporation of Pennsylvania
No Drawing. Filed July 2, 1957, Ser. No. 669,413
5 Claims. (Cl. 260—514)

This invention relates to certain new and useful substitution products of polyfluoroolefins and processes of making such products.

This is a continuation-in-part of my copending application Serial No. 377,711, filed August 31, 1953, now Patent No. 2,808,425 issued October 1, 1957.

It has been noted that a polyfluorohydrocarbon group may have a marked effect on the chemical properties of adjacent organic functional groups. The present invention is concerned with unsaturated compounds having a polyfluorohydrocarbon group adjacent to an unsaturated carbon atom and with reactions involving such compounds.

In accordance with one aspect of my above copending application, there is provided a new class of compounds represented by the general formula $R_fCH=CHX$ in which $R_f$ is a polyfluorohydrocarbon group having at least two fluorine atoms on the carbon atom nearest the olefinic bond, and X represents fluorine, cyano, or a primary or secondary amine radical.

In preparing a compound of the class defined above according to the above application, a polyfluorohydrocarbon-substituted acetylene $R_fC\equiv CH$ is reacted with a compound HX as follows:

$$R_fC\equiv CH+HX \rightarrow R_fCH=CHX$$

where X is fluorine, cyano, or a primary or secondary amine radical. The marked effect of the polyfluorohydrocarbon group may be noted in the above reaction in that the addition takes place in the opposite sense, with reference to the direction of the H and the X respectively, to the addition that takes place in the case of an acetylene not containing a polyfluorohydrocarbon group near the acetylenic bond. Furthermore, when X is a primary or secondary amine radical, the addition takes place more readily than with the corresponding non-fluorinated acetylenic hydrocarbon.

The addition may be brought about simply by bringing the reactants together at room temperature or slightly elevated temperatures under pressure, especially in the case of HF addition, or may be catalyzed by boron trifluoride (for HF addition), or by copper salts such as cuprous chloride (in the case of HCN or amine addition).

In the case of the $R_fC\equiv CH$ starting compound, it is preferred that $R_f$ should be a perfluorohydrocarbon group namely a perfluoroalkyl, perfluorocycloalkyl or perfluoroaromatic group, and of these latter groups those particularly preferred are perfluoroalkyl having not more than 20 carbon atoms, perfluorocycloalkyl having not more than 6 carbon atoms in the ring, perfluorophenyl and its analogues and homologues. Examples of the $R_fC\equiv CH$ starting compounds include perfluoromethyl-, perfluoroethyl-, perfluoropropyl-, perfluoroisopropyl-, the various perfluorobutyl-, the various perfluoroamyl-, the various perfluorohexyl-, perfluorocyclohexyl-, and perfluorophenyl- substituted acetylenes, as well as perfluoro homologues of these compounds.

The new compounds disclosed in my copending application and represented by the type formula $R_fCH=CHX$ given above are useful for various purposes, particularly as intermediates in the preparation of other highly fluorinated chemicals since in every case these compounds contain a reactive olefinic bond.

The present application is particularly concerned with compounds of this class, where X is —CN. According to the present invention these compounds may be hydrolysed to give highly fluorinated carboxylic acids and derivatives of such acids. Thus the present invention comprises a method for the manufacture of compounds having the formula $$R_fCH=CHCOOH$$

where $R_f$ is a polyfluorohydrocarbon group, which comprises hydrolysing in the presence of a base, a compound having the structure $$R_fCH=CHCN$$

Examples of nitriles which are suitable for use in the new method are $CF_3CH=CHCN$, $C_2F_5CH=CHCN$, $C_3F_7CH=CHCN$, $C_4F_9CH=CHCN$, $C_5F_{11}CH=CHCN$, $C_6F_{13}CH=CHCN$,

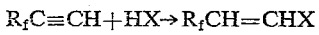
$$CF_2CF_2CF_2CF_2CF_2CFCH=CHCN$$

and $C_6F_5CH=CHCN$.

A particularly useful class of compounds within the invention is represented by the formula $$C_nF_{2n+1}CH=CHCN$$

where $n$ is a number not greater than 20.

The hydrolysis is preferably carried out by heating the nitrile in the presence of a base, for example, in dilute (say 0.1 to 15%) aqueous sodium or potassium hydroxide. The temperature at which the reaction is conducted will generally range between about 0 and about 100° C., preferably between about 20° C. and about 60° C. Pressure is not a critical factor and may range from 10 to 100 p.s.i.g. Reaction time is again not critical and may range from 0.5 to 48 hours.

A typical acid which can be produced in accordance with the invention is $\gamma,\gamma,\gamma$-trifluorocrotonic acid, which is an acid considerably stronger than either the corresponding $\gamma,\gamma,\gamma$-trifluorobutyric acid, or the corresponding unsubstituted crotonic acid. Other examples of these acids may be derived from the various cyano compounds listed above. These acids are all strong acids and are useful inter alia, as thermally stable surface active agents, e.g. in reducing loss of chromium from chromium plating baths; in reducing the loss of gasoline from gasoline storage tanks; in polymerisation recipes for use with olefins, particularly fluoro-olefins. The double bond in the olefinic acid enables Diels-Alder adducts to be prepared, some of which have biological activity.

These carboxylic acids may also be conveniently prepared by another route involving the two following reactions:

$$R_fI+CH_2=CHCN \longrightarrow R_fCH_2CHICN$$

$$R_fCH_2CHICN \xrightarrow[\text{and hydrolysis}]{\text{Dehydroiodination}} R_fCH=CHCOOH$$

The first of the above reactions may, for example, be carried out by subjecting the reactants under moderate pressure, say between about 5 p.s.i.g. and about 700 p.s.i.g., to ultraviolet light.

Temperature is not critical and may range between about 0 and about 180° C. Reaction time is also not critical and is normally between about 5 and about 100 hours. Normally between about 1 and about 10 moles of iodide are used per mole of nitrile.

The dehydroiodination and hydrolysis involved in the second reaction is readily accomplished by means of alcoholic potash.

The reaction conditions in this case are entirely conventional. Temperature is ordinarily —10 to 80° C. Pressure may range from 14 to 140 p.s.i.g. Reaction time is usually from about 0.5 to about 24 hours. Usually between about 0.1 and about 5 moles of KOH are used, per mole of nitrile, in concentration of between about 0.5 and about 20% by weight.

The intermediate polyfluoroiodonitriles represented in the above two reactions are a new class of chemical compounds, one example thereof being γ,γ,γ-trifluoro-α-iodobutyronitrile. They are useful as, for example, chain transfer agents for the control of the chain length of polymers, particularly of fluoropolymers; special fire-extinguishers; production of polyfluoro-alkyl-acrylonitriles $R_fCH:CHCN$ and thence of fluoroacrylopolymers.

The salts of the above-noted carboxylic acids of my invention are also compounds of considerable interest. Thus, the salts of the above-noted acids may be decarboxylated in accordance with a process which represents another aspect of my invention to form the corresponding olefins of one less carbon atom in accordance with a reaction which may be represented as follows:

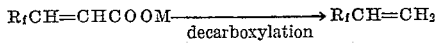

$$R_fCH=CHCOOM \xrightarrow{\text{decarboxylation}} R_fCH=CH_2$$

where M is a metal, preferably an alkali metal. In general, the decarboxylation reactions above referred to are carried out in the presence of a solvent from which hydrogen can be abstracted.

In a typical process, the sodium salt may be heated at a temperature of say 50 to 350° C. with between say 1 to 20 moles of ethylene glycol in the presence of say 0.1 to 10 moles of boric acid, per mole of salt. Pressure is not critical and may range from about 10 to about 100 p.s.i.g. Reaction time is ordinarily from about 1 to about 40 hours.

These unsaturated compounds may in many cases be polymerized by conventional means to give polyethylene chains having highly fluorinated side chains which are useful as heat resistant plastics and lubricants.

The silver salt may be simultaneously decarboxylated and iodinated, in a process that represents another aspect of my invention, to give the iodoolefin of one less carbon atom following a reaction which may be represented as follows:

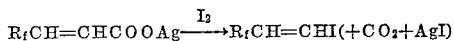

$$R_fCH=CHCOOAg \xrightarrow{I_2} R_fCH=CHI (+CO_2+AgI)$$

This reaction is preferably carried out at between about 50 and about 350° C. The pressure is preferably subatmospheric and may range from say 0.1 to about 10 p.s.i.g. Reaction time will normally be from about 0.5 to about 10 hours. Usually between about 0.5 and about 10 moles of iodine ($I_2$) will be used, per mole of salt.

The products are useful as specialist fire-extinguishers and for the preparation of polyfluoroalkylacetylenes.

The following examples, in which all parts are by weight, serve to illustrate the various aspects of my invention.

Example I

Trifluoromethylacetylene (0.94 part) was sealed in a pressure vessel with anhydrous hydrogen cyanide (0.81 part), potassium cyanide (0.1 part), potassium chloride (0.2 part), cuprous chloride (0.8 part), and water (10 parts), and heated to 110° C. for 24 hours. Unchanged trifluoromethylacetylene (48%) was recovered. A similar experiment carried out at 120° C. for 36 hours gave 36% recovered trifluoromethylacetylene. The combined liquid phase material was filtered through glass wool. This liquid phase material contained γ,γ,γ-trifluorocrotonitrile in a yield in excess of 60% based on trifluoromethylacetylene consumed.

The liquid phase material was then treated with an excess of 10% sodium hydroxide solution and slowly heated under reflux to 80° C. After filtration the solution was acidified (sulfuric acid) and continuously extracted by ether for 24 hours. After drying (sodium sulfate), the ether was removed and the residual solid was fractionally recrystallized from petroleum ether to give γ,γ,γ-trifluorocrotonic acid. (Found: C, 34.1; H, 2.3; Equivalent 140. $C_4H_2O_2F_3$ requires C, 34.3; H, 2.1; Equivalent 140) M.P. 51° C.

Example II

Acrylonitrile (0.53 part) was sealed with excess of trifluoroiodomethane (8.5 parts) in a pressure vessel which was then irradiated by ultraviolet light for 48 hours. The excess trifluoroiodomethane was removed and unchanged acrylonitrile (ca. 0.01 part) was distilled from the residual liquid in vacuo. The γ,γ,γ-trifluoro-α-iodobutyronitrile was separated from a trace of polyacrylonitrile by distillation in vacuo. and treated immediately with a 5% excess of 10% alcoholic potassium hydroxide initially at room temperature and finally at 50° C. for one hour. After acidification with excess dilute sulfuric acid, ether extraction followed by crystallization from petroleum ether gave γ,γ,γ-trifluorocrotonic acid (1.02 parts; 72%) M.P. 50.5–51° C.

Example III

The trifluorocrotonic acid of Example II was converted to its sodium salt (0.40 part), which was then placed in a distillation vessel containing ethylene glycol (15 parts) and boric acid (2 parts), and fitted with reflux condenser leading to traps cooled by liquid air. The temperature was raised from 150 to 200° C. over 4 hours and by controlled pumping a vigorous reflux was maintained and the volatile products of reaction were removed from the reaction vessel. These were then passed through 15% sodium hydroxide, and the residual gas, dried by distillation in vacuo, was found to be 3,3,3-trifluoropropene (0.99 part; 41%).

Example IV

The silver salt (1.23 parts), prepared from the trifluorocrotonic acid of Example II by treatment with silver oxide or carbonate was dried in vacuo and mixed with dry powdered iodine (3 parts). The mixture was then rapidly heated in a silica trap at a pressure ca. 10 mm., so that the reaction products collected in an adjacent trap cooled in liquid air. After removal of the carbon dioxide by allowing the trap to warm to room temperature, the excess iodine was removed by treatment with thiosulfate and the liquid distilled to give only 3,3,3-trifluoro-1-iodopropene (0.83 part; 76%). The absence of isomers was shown by examination of the infra-red spectrum.

It should be pointed out that the expression polyfluorohydrocarbon group used herein does not exclude hydrocarbon groups in which halogen substituents other than fluorine are present.

It will be obvious to those skilled in the art that many modifications may be made within the scope of the present invention without departing from the spirit thereof, and the invention includes all such modifications.

What I claim is:

1. A method of making a compound having the structure $R_fCH=CHCOOH$ in which $R_f$ is selected from the group consisting of perfluoroalkyl having not more than about 20 carbon atoms, perfluorocycloalkyl having not more than about 6 carbon atoms in the ring, and perfluorophenyl which comprises effecting an addition reaction by means of ultraviolet light between acrylonitrile and a compound of the general formula $R_fI$ to form $R_fCH_2CHICN$, $R_f$ in each formula being the same as given above, and dehydroiodinating and hydrolyzing the $R_fCH_2CHICN$ by treatment with a base.

2. The method according to claim 1 in which $R_f$ is perfluorophenyl.

3. The method according to claim 1 in which $R_f$ is a perfluoroalkyl group containing not more than about 20 carbon atoms.

4. The method according to claim 1 in which $R_f$ is perfluorocycloalkyl having not more than about 6 carbon atoms.

5. The method of making γ,γ,γ-trifluorocrotonic acid which comprises effecting an addition reaction by means of ultra-violet light between acrylonitrile and trifluoroiodimethane and dehydroiodinating and hydrolyzing the resulting γ,γ,γ-trifluoro-α-iodobutyronitrile by treatment with an alkali metal hydroxide in alcoholic solution followed by acidification with a mineral acid.

References Cited in the file of this patent

UNITED STATES PATENTS

| | | |
|---|---|---|
| 2,176,181 | Hunsdiecker et al. | Oct. 17, 1939 |
| 2,365,808 | D'Ianni | Dec. 26, 1944 |
| 2,376,067 | Long | May 15, 1945 |
| 2,425,426 | Joyce | Aug. 12, 1947 |
| 2,723,297 | Litant et al. | Nov. 8, 1955 |
| 2,730,543 | Rendall et al. | Jan. 10, 1956 |
| 2,802,028 | England | Aug. 6, 1957 |
| 2,808,425 | Haszeldine et al. | Oct. 1, 1957 |
| 2,833,831 | Haszeldine | May 6, 1958 |

OTHER REFERENCES

Sidgwick: "Organic Chemistry of Nitrogen," new revised edition, 1949, pages 312–313.